Patented Feb. 22, 1927.

1,618,702

UNITED STATES PATENT OFFICE.

MARTIN J. FORSELL, OF SEATTLE, WASHINGTON.

INSECTICIDE.

No Drawing.  Application filed August 30, 1926. Serial No. 132,658.

My invention relates to improvements in an insecticide and the object of my invention is to provide a composition of matter that is adapted for use to destroy the three species of weevils known as the strawberry root weevils which are known as the *Otiorhyncus salcatus*, *Otiorhyncus rugifrous* and *Otiorhyncus oratus*, which attack and destroy the strawberry plants.

The insecticide consists of using apple after it is dried and powdered and mixing therewith any well known poison in powdered form, preferably any one of the compounds of arsenic or one of the derivatives of arsenious or arsenic acid such as magnesium arsenate or any one of the compounds of fluorine preferably sodium or potassium fluoride or sodium or potassium silico fluoride or the sodium or potassium salts of hydrofluo silicic acid.

I have found by extensive tests that the above named weevils prefer to eat this insecticide in preference to the strawberry plant. In fact in my laboratory experiments I have found that these weevils will leave the leaves and roots of the plant upon which they are feeding and eat this insecticide.

I have also found that these weevils will not eat the poison unless it is thoroughly mixed with the apple in such a manner that, in eating the apple, the weevils have to consume some of the poison.

This insecticide is formed by taking approximately ninety six and one half percent of apple or apple chop, or screenings or pomace that has been dried and powdered or pulverized and approximately three and one half percent of poison in the powdered or pulverized form and then mixing the same, in a suitable container, until the particles of the apple and poison have become thoroughly coated with one another.

This insecticide may then be placed among stems and adjacent the strawberry plants upon which the weevils are feeding and they will immediately leave the plant and devour this composition of matter whereupon they will be destroyed. This composition of matter will not destroy any of the insects that are beneficial to the strawberry plants.

I have also discovered that apple is the only ingredient that these weevils will eat in preference to the strawberry plant and when the particles of the apple and poison are thoroughly coated with one another the weevils will devour the poison in order to eat the apple.

What I claim is:

1. An insecticide consisting of powdered apple and powdered poison that has been mixed so that the particles of the apple and poison have been thoroughly coated with one another.

2. An insecticide consisting of a derivative of apple in powdered form and powdered poison mixed so that the particles of the derivative of apple and poison have been thoroughly coated with one another.

In witness whereof, I hereunto subscribe my name.

MARTIN J. FORSELL.